United States Patent [19]

Yoshioka et al.

[11] Patent Number: 4,504,554

[45] Date of Patent: Mar. 12, 1985

[54] ROTOR SHAFT OF STEAM TURBINE

[75] Inventors: Takatoshi Yoshioka; Seishin Kirihara; Masao Siga; Takehiko Yoshida; Katsukuni Hisano; Toshimi Tan; Masahiro Kobayashi, all of Hitachi, Japan

[73] Assignee: Hitachi, Ltd., Tokyo, Japan

[21] Appl. No.: 363,493

[22] Filed: Mar. 30, 1982

[30] Foreign Application Priority Data

Apr. 3, 1981 [JP] Japan .................................. 56-50832

[51] Int. Cl.³ ........................ B23K 9/04; B23K 35/30; F01D 5/06; F01D 25/16
[52] U.S. Cl. .................................. 428/683; 428/684; 148/127
[58] Field of Search ................. 428/683, 684; 148/127

[56] References Cited

FOREIGN PATENT DOCUMENTS 55-16744 2/1980 Japan .

Primary Examiner—Veronica O'Keefe
Attorney, Agent, or Firm—Antonelli, Terry & Wands

[57] ABSTRACT

A steam turbine rotor shaft comprising the main body of the rotor shaft made of a high Cr steel of martensite structure, and a journal having a plurality of built-up welding layers formed successively said main body, the outer surface portion of the journal being made of steel containing 0.5 to 3 wt % of Cr, and a method of producing same.

16 Claims, 5 Drawing Figures

ROTOR SHAFT OF STEAM TURBINE

The present invention relates to a rotor shaft of a steam turbine and, more particularly, to a steam turbine rotor shaft made of a high Cr steel of martensite structure, provided on the journal portion with a built-up welding layer of a high anti-cracking property.

In recent years, 12% Cr steel having a high strength and toughness is used as the material of the steam turbine rotor shafts. In the conventional steam turbine rotor shafts, a coupling is fixed to one end thereof by a shrinkage fit to permit a connection between the rotor shaft of the steam turbine and the rotor shaft of the driven machine such as a generator. It is, however, considered that the best way to attach the coupling is to form the coupling as a part integral with the rotor shaft. The 12% Cr steel used as the material of the rotor shaft, however, has an inferior bearing property and, there is a tendency that the bearings are apt to be damaged undesirably by the journal portion made of the 12% Cr steel.

In order to overcome this problem, Japanese Patent Laid-open Publication No. 16744/1980 proposes to build up the journal portion by a welding rod having a Cr content around 0.1% by a technic called build-up welding or overlay welding. This method, however, proved to be insufficient in the wear resistance at high temperature and mechanical strength at high temperature because of small Cr content of about 0.1 wt %. The built-up welding on high Cr steel by use of a welding rod having low Cr content seriously deteriorates the ductility of the weld zone regarding the first and second welding layers, so that a cracking is initiated and developed from the built-up welding portion of the rotor during operation of the turbine. In the worst case, the crack is developed to cause a serious breakdown of the rotor.

SUMMARY OF THE INVENTION

Under these circumstances, the present invention aims as its major object at providing a steam turbine rotor shaft provided with a journal portion of an excellent bearing property, thereby to obviate the above-described problems of the prior art.

To this end, according to the invention, there is provided a steam turbine rotor shaft made from a high Cr steel of martensite structure, provided with built-up welding layers on the journal portions thereof, characterized in that the outer surface region of said built-up welding layers contains 0.5 to 3 wt % of Cr, and the balance Fe.

The built-up welding layer on the steam turbine rotor shaft of the invention preferably has tempered bainite and tempered martensite structures and a precipitation of carbides. Preferably, the surface region of the built-up welding layer has a chemical composition consisting essentially of, by weight, 0.01 to 0.20% of C, 0.3 to 1% of Si, 0.3 to 1.5% of Mn, 0.5 to 3% of Cr and 0.1 to 1.5% of Mo. On the other hand, the high Cr steel used as the material of the main body of the rotor shaft of the invention has a chemical composition consisting essentially of, by weight, 0.1 to 0.3% of C, 0.4 to 1.2% of Mn, less than 0.6% of Si, less than 1.2% of Ni, 8 to 13% of Cr, 0.5 to 1.5% of Mo, 0.03 to 0.15% of Nb, 0.1 to 0.3% of V and 0.04 to 0.2% of N and the balance Fe.

It is also preferred that the Cr content of the built-up welding layers formed on the journal portion of the rotor shaft is gradually decreased from the radially inner portion towards the radially outer portion. Particularly, it is advisable to use a plurality of welding rods of different Cr contents, such that the inner layer is formed by the welding rod having a comparatively high Cr content and the welding rods of smaller Cr contents are used for forming outer layers. By so doing, it is possible to eliminate the problem of the serious reduction in the ductility in the weld zone regarding the initial layer which reduction is attributable to the large difference in Cr content between the main body of the rotor shaft and the initial built-up welding layer and, therefore, it is possible to effect the built-up welding of the desired composition without causing any weld cracking which is the major reason for the cracking of the turbine rotor being caused during the operation. In consequence, it is possible to form built-up welding layers in such a manner that, while the difference in the Cr content between the initial layer and the material of the main body is made relatively small, the surface portion of outermost layer exhibits a superior bearing property, as well as a large wear resistance and mechanical strength at high temperature.

For providing the initial layer on the main body of the rotor shaft, welding rods having Cr contents 2 to 5% smaller than that of the rotor main body are selectively used. When the initial layer is made with such a welding rod, the main body is partially melted to permit the dilution of Cr of the main body to thereby increase the Cr content of the initial layer so that, after the welding of the initial layer, the difference in the Cr content between the initial welding layer and the rotor shaft main body is decreased to about 1 to 3% by weight. Welding rods of successively decreasing Cr contents are used for the formation of successive built-up welding layers. The outermost layer to be mechanically finished to have a bearing surface is made by a welding rod containing 0.5 to 3 wt % of Cr, in order to obtain a sufficiently high wear resistance and mechanical strength at high temperature.

The journal portions of the rotor shaft of steam turbine are heated up to a considerably high temperature due to friction during the operation of the turbine. This is the reason why the journal portions are required to have a high mechanical strength and high wear resistance at high temperature. A small Cr content less than 0.5% cannot satisfy these requirements. On the other hand, a Cr content in excess of 3% undesirably permits the formation of carbides which are so hard that the bearings are damaged unfavourably. The most preferred range of the Cr content of the welding rod for the surface portion in the outermost layer is between 1 and 2%.

In the build-up welding, the main body of the rotor shaft is preheated to a temperature between 200° and 280° C. and, then, a shielded metal arc welding is preferably effected spirally in the circumferential direction along the cylindrical surface of each journal portion of the main body. The interlayer temperature is preferably between 200° and 300° C. After the completion of the built-up welding, the weld metal is cooled down to a temperature between Ms point (the temperature at which martensite transformation begins) and Mf point (the temperature at which the martensite transformation finishes), preferably between 200° and 230° C. Then, the heat-affected zone of the rotor shaft main body is subjected to a postheating treatment comprising the steps of holding the heat-effected zone at a predetermined temperature, preferably at a temperature of 400°–450° C. for 1–5 hours so as to effect the reduction of hydrogen content, and quenching from this temperature to cause the martensite transformation of the heat-affected zone. Then, after the weld metal is held at a temperature between Ms point and Mf point, preferably at a temperature of 150°–200° C. for preferably 1–5 hours to make both the temperatures of the inner and outer parts constant, the weld metal is subjected to S.R. (Stress Relieving) treatments preferably more than 2 times which treatment comprises the step of holding it at a temperature lower than the temperature of tempering of the main body effected after the hardening of the main body of the rotor shaft, preferably at a temperature of 600°–650° C., or most preferably at about 630° C., for 20–50 hours or preferably about 6 hours.

The surface portion of the outermost layer formed on the journal portion of the main body of the rotor shaft is preferably made of an alloy consisting essentially of, by weight, 0.01 to 0.2% of C, 0.1 to 1.0% of Si, 0.1 to 1.5% of Mn, 0.5 to 3% of Cr, less than 0.1% of Ni, less than 1.5% of Mo and the balance Fe.

Other features and advantages of the invention will become clear from the following description of the preferred embodiments taken in conjunction with the accompanying drawings.

EMBODIMENT 1

Figure 1:
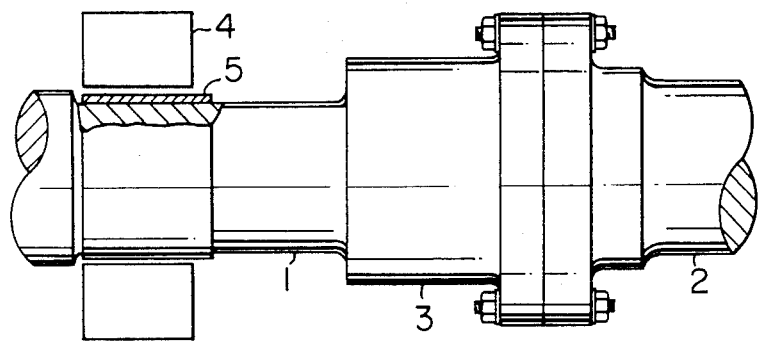
FIG. 1 illustrates the construction of a steam turbine rotor shaft around the journal portion.

Referring to FIG. 1 which is a partly-sectioned side elevational view of an example of a steam turbine rotor shaft, a reference numeral 1 denotes the main body of the turbine rotor shaft, 2 denotes the rotor shaft of a generator driven by the steam turbine, 3 denotes a coupling for connecting these rotor shafts to each other, 4 denotes a bearing and 5 denotes a journal having built-up welding layers. As will be clearly seen from FIG. 2, the welding layers include a first layer 6, a second layer 7 and a third layer 8. The outer surface of the third layer 8 is worked mechanically. The cylindrical interface defined between the first layer 6 and the main body portion 1 under the layer has a diameter substantially equal to that of the cylindrical surface of the main body adjacent to the journal portion 5. Alternatively, the interface between the first layer and the main body may be of a spherical face. An example of the chemical composition by weight of the alloy constituting the main body of the rotor shaft is shown in Table 1 below.

The main body of the rotor shaft was held at 1050° C. for 24 hours while slowly rotated in a shaft furnace. Next, after quenching by water spray, the main body was held at 150° C. for 24 hours, and then the tempering of the main body was effected at 560° C. for 36 hours and at 620° C. for 24 hours. The whole of the main body of the rotor shaft has tempered martensite structure.

TABLE 1

| C | Si | Mn | P | S | Ni | Cr | Fe |
|---|---|---|---|---|---|---|---|
| 0.18 wt. % | 0.30 | 0.65 | 0.018 | 0.005 | 0.55 | 10.58 | Balance |

Figure 2:
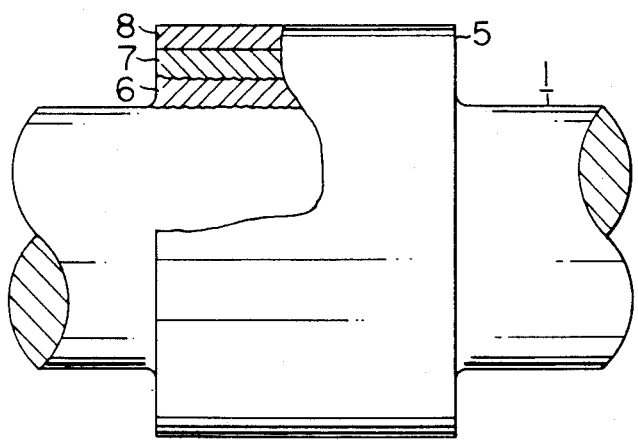
FIG. 2 is an enlarged sectional view of the journal portion as shown in FIG. 1.
Figure 3:
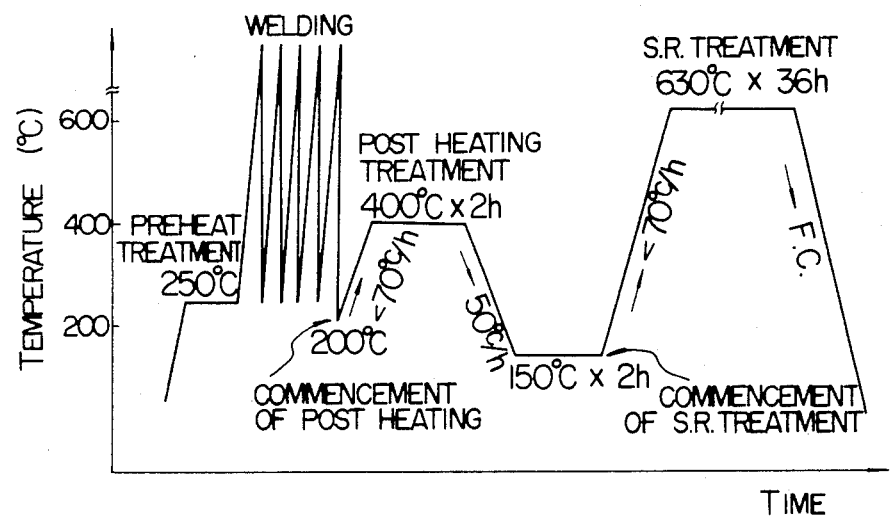
FIG. 3 is an illustration of the conditions of built-up welding to form the journal portion of the steam turbine rotor shaft in accordance with the invention.

A shielded metal arc welding is effected spirally in the circumferential direction along the surface of the main body to form built-up welding layers comprising five layers. The built-up welding was conducted under the condition of welding current of 170 A, voltage of 24 V, speed of 26 cm/min and inter-pass temperature of 250° C. Then, a heat treatment was conducted in a manner as shown in FIG. 3. After the completion of the built-up welding, the outermost layer and the next layer thereunder were removed by a mechanical working to leave three built-up welding layers on the journal portion as shown in FIG. 2. The axial length of the journal after the mechanical working was 500 mm. The thicknesses of the initial layer 6 and the second layer 7 were about 3 mm, respectively, while the thickness of the finally worked outermost layer 8 was about 2.8 mm. The thickness of the outermost layer 8 should preferably falls within the range of between 1 and 3 mm. The journal has an outside diameter of 533 mm.

Table 2 shows the chemical compositions (weight %) of a deposite metal, i.e., a portion which is not affected by the phenomenon of mixing with the constituents of the parent metal, of the shielded metal arc welding rods having a diameter of about 4 mm used in the built-up welding.

More specifically, the initial layer 6 was formed by the welding rod A. Similarly, welding rods B and C were used for the formation of second and third layers 7 and 8. The fourth and fifth layers, which are to be removed later by a mechanical working, were formed with the welding rod D.

TABLE 2

| No. | C | Si | Mn | P | S | Ni | Cr | Mo | Fe |
|---|---|---|---|---|---|---|---|---|---|
| A | 0.06 wt % | 0.45 | 0.65 | 0.010 | 0.011 | — | 7.30 | 0.50 | Balance |
| B | 0.03 wt % | 0.65 | 0.70 | 0.009 | 0.008 | — | 5.13 | 0.53 | Balance |
| C | 0.03 wt % | 0.79 | 0.56 | 0.009 | 0.012 | 0.01 | 2.34 | 1.04 | Balance |
| D | 0.03 wt % | 0.70 | 0.90 | 0.007 | 0.016 | 0.03 | 1.30 | 0.57 | Balance |

In the state after the built-up welding and the mechanical working, the Cr contents of the initial bead 6, second layer 7 and the third layer 8 were about 8.8%, about 5.7% and about 2.8%, respectively, by weight. The built-up welding layer constituting the outer surface of the journal had a chemical composition which consists essentially of, by weight, 0.03% of C, 0.78% of Si, 0.60% of Mn, 0.01% of Ni, 1.02% of Mo and the balance Fe and inevitable impurities, in addition to the above-mentioned Cr content.

Figure 4:
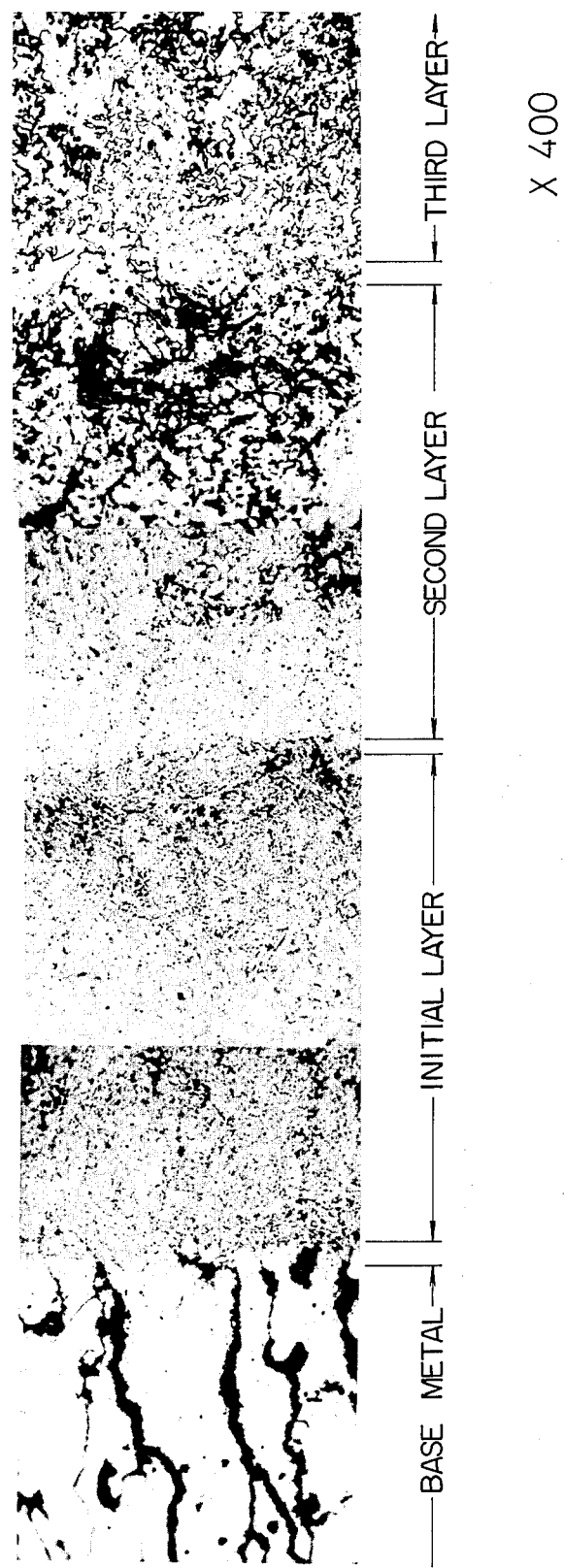
FIG. 4 shows microscopic photographs of the cross-section of the journal shown in FIG. 2.

The rotor shaft thus formed was subjected to a were test and showed a remarkably improved bearing property as compared with the rotor shaft body of high Cr steel having martensite structure. As will be seen from FIG. 4, the outer surface portion cf the built-up welding layer had tempered bainite structure and tempered martensite structure. The journal portion of the rotor shaft of this embodiment exhibited high were resistance and high mechanical strength at high temperature.

EMBODIMENT 2

A journal portion having five built-up welding layers or layers was formed on the same rotor shaft as the Embodiment 1 under the same conditions of welding and heat treatment. More specifically, the initial layer was formed with the welding rod B of Table 2, while the second layer was formed with the welding rod C. The forth and fifth layers were formed with the welding rod D. Thereafter, the fourth and fifth layers were removed by mechanical working to form the journal.

In the state after the completion of the mechanical working, the Cr contents of the initial layer, second layer and the third layer were 7.3 wt %, 4.8 wt % and 1.6 wt %, respectively.

The rotor shaft thus produced was subjected to a wear test and exhibited a remarkably improved bearing property as compared with the rotor shaft of high Cr steel having martensite structure. Thus, the high wear resistance and mechanical strength at high temperature were confirmed also in this embodiment.

Next, an experiment was conducted in order to investigate how the reduction in ductility in the weld zone regarding the initial layer, which reduction is apt to cause cracking of the rotor shaft during operation, is related to the chemical compositions of the built-up welding layers. The test was conducted using a plate member which has a chemical composition and structure substantially same as those of the material of the rotor body and a heat capacity substantially equal to that of the rotor main body. A built-up welding was effected to form five successive layers on the plate member, using the same condition as that for the formation of the journal, i.e. the condition shown in FIG. 3. The plate member was 72 mm thick, 135 mm wide and 200 mm long. A test piece for side bending test, 30 mm thick, 9 mm wide and 200 mm long was cut out of this plate member having the layers.

The conditions for the built-up welding and the heat treatment were substantially identical to those of Embodiment 1 described before. Using combinations of the welding rods as shown in Table 3, five padding layers, each being about 3 mm thick, was formed on the plate member.

TABLE 3

| Test piece No. | 1st head | 2nd | 3rd | 4th | 5th |
|---|---|---|---|---|---|
| 1 | D | D | D | D | D |
| 2 | B | C | D | D | D |
| 3 | A | B | C | D | D |

Alphabets in Table identify welding rods shown in FIG. 1.

Figure 5:
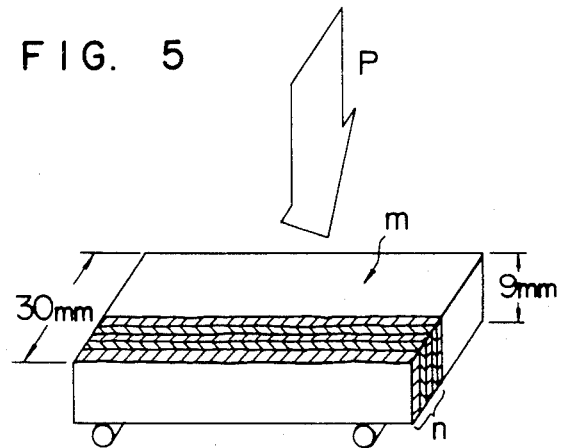
FIG. 5 is a schematic illustration of a side bending test.

In order to investigate the ductility of the weld zone, a 160° side bending test was conducted with these test pieces, and the bent test pieces were checked by microscope for any cracking. FIG. 5 schematically illustrates the manner of the side bending test, in which P represents the direction of side bending, while m and n represent the side bending test piece and the layers, respectively.

In the test piece Nos. 1 in which all layers from the initial one to the outermost one are formed solely with the welding rod D (Cr content 1.3%) in the same conditions as those of the test pieces 2 and 3, cracks were bound in the initial and second layers as a result of the side bending. In contrast, no crack was observed in the test pieces Nos. 2 and 3 which were formed by successive welding rods of successively decreasing Cr contents.

From the result of this experiment, it was confirmed that, in the case where the built-up welding layers are formed by successive welding rods of different Cr contents such that the initial layer is formed with a welding rod having the greatest Cr content and the successive layers are formed with welding rods of successively decreasing Cr contents, the weld zone of the initial and second layers have sufficient ductility so that the cracking of the rotor shaft during operation is completely prevented from occurring.

Using plate members having various Cr contents within the standard range specified regarding 12% Cr rotor shaft materials and welding rods of various compositions, further experiments were conducted to determine in detail the relationship between the Cr content and the cracking in the side bending test. As a result of these experiments, it is proved that the tendency of the occurrence of cracking is largely suppressed if there is provided a journal having the weld zone of a high ductility. Thus, the cracking at the built-up welding zone of the rotor shaft during operation is prevented from occurring, when the compositions of the welding rods are selected such that the Cr contents of the first layer, second layer and the third and subsequent layers range between 6.5 and 9%, between 4.5 and 6% and between 0.5 and 3%, respectively.

As has been described, according to the invention, it is possible to obtain a steam turbine rotor shaft having high wear resistance and a high mechanical strength at high temperature as well as an excellent bearing property by forming a journal prepared upon the main body of the rotor shaft by built-up welding such that the surface portion of the journal is made of a Cr-steel containing chromium of 0.5-3 weight %. Furthermore, by gradually decreasing the Cr contents of the built-up welding layers from the inner side towards the outer side, it is possible to obtain a steam turbine rotor shaft in which the fear of cracking during operation is completely eliminated to ensure a high reliability of the rotor shaft.

What is claimed is:

1. A steam turbine rotor shaft comprising:
   a main body of the rotor shaft made of a high Cr steel having a matrix of tempered martensite structure in which carbides are precipitated and consisting essentially of, by weight, 0.1 to 0.3% of C, 0.4 to 1.2 wt % of Mn, not more than 0.6 wt % of Si, not more than 1.2 wt % of Ni, 8 to 13% of Cr, 0.5 to 1.5 of Mo, 0.03 to 0.15% of Nb, 0.1 to 0.3% of V, 0.04 to 0.2% of N and the balance of Fe; and
   a journal having a plurality of built-up welding layers formed successively on said main body, with the radially innermost layer having the highest Cr content and the radially outermost layer having the lowest Cr content; the outermost layer having an outer surface portion with a composition consisting essentially of, by weight, 0.01 to 0.2% of C, 0.1 to 1.0% of Si, 0.1 to 1.5% of Mn, 0.5 to 3% of Cr, not more than 1.1% of Ni, not more than 1.5% of Mo, and the balance Fe.

2. A steam turbine rotor shaft as claimed in claim 1, wherein
   the Cr content of successive layers being successively decreased and said innermost layer adjacent to said main body being made of steel containing chromium less in content by 1 to 3 wt % than that of said main body.

3. A steam turbine rotor shaft as claimed in either one of claims 1 and 2, wherein the outer surface portion of said journal has tempered bainite structure and tempered martensite structure.

4. A steam turbine rotor shaft as claimed in claim 2, wherein, as viewed in the direction from the radially inner side towards the radially outer side, the first layer has a Cr content ranging between 6.5 and 9 wt %, second layer has a Cr content ranging between 4.5 and 6 wt % and the third and further layers have Cr content ranging between 0.5 and 3 wt %.

5. A steam turbine rotor shaft as claimed in claim 4, wherein the outer surface portion of said journal has tempered bainite and tempered martensite structures.

6. A steam turbine rotor shaft as claimed in any one of claims 1,2 and 4, wherein said journal comprises at least three built-up welding layers and the thickness of the outermost layer ranges between 1 and 3 mm.

7. A steam turbine rotor shaft as claimed in any one of claims 1, 2, 4, and 5, wherein the interface between the built-up welding layer and the main body is of a spherical face.

8. A steam turbine rotor shaft as claimed in any one of claims 1, 2, 4, and 5, wherein the cylindrical interface between the initial layer and the main body of the rotor shaft substantially conform with the cylindrical surface of the rotor shaft main body adjacent to the journal.

9. A steam turbine rotor shaft as claimed in any one of claims 1, 2, 4, and 5, wherein the built-up welding layers are formed by arc welding effected spirally in the circumferential direction along the journal portion of said main body of said rotor shaft.

10. A method of producing a steam turbine rotor shaft having a main body made of high chromium steel having a matrix of tempered martensite structure in which carbides are precipitated and consisting essentially of, by weight, 0.1 to 0.3% of C, 0.4 to 1.2 wt % of Mn, not more than 0.6 wt % of Si, not more than 1.2 wt % of Ni, 8 to 13% of Cr, 0.5 to 1.5 of Mo, 0.03 to 0.15% of Nb, 0.1 to 0.3% of V, 0.04 to 0.2% of N and the balance of Fe which main body has a journal portion at which a journal is to be formed, comprising the steps of preheating at least the journal portion of the main body, outermost layer having an outer surface portion with a composition consisting essentially of, by weight, 0.01 to 0.2% of C, 0.1 to 1.0% of Si, 0.1 to 1.5% of Mn, 0.5 to 3% or Cr, not more than 1.5% of Mo, and the balance Fe, holding a weld zone at a predetermined temperature to reduce the hydrogen content of the weld zone, cooling the weld zone from the predetermined temperature to cause the martensite transformation of the weld heat-affected zone of the main body, and effecting stress relief annealing.

11. A method of producing a steam turbine rotor shaft as claimed in claim 10, wherein the preheating is effected at a temperature of 200–280° C.

12. A method of producing a steam turbine rotor shaft as claimed in claim 10, wherein interlayer temperature is in a range of 200° to 300° C.

13. A method of producing a steam turbine rotor shaft as claimed in claim 10, wherein the stress relief annealing is effected at a temperature lower than the tempering temperature of the main body, preferably at a temperature of 600°–650° C.

14. A method of producing a steam turbine rotor shaft as claimed in claim 10, wherein the built-up welding is effected spirally in a circumferential direction of the main body to form a plurality of layers of weld metal.

15. A method of producing a steam turbine rotor shaft as claimed in claim 10, wherein the post heating treatment for reducing hydrogen content of the weld zone is effected at a temperature of 400°–450° C.

16. A method of producing a steam turbine rotor shaft as claimed in any one of claims 10 to 15, the built-up welding being effected to provide four or more built-up welding layers on the surface of the journal portion of the main body, further comprising the step of mechanically working the built-up welding layers to leave at least three layers so as to finish the surface of the journal of the rotor shaft.

* * * * *